(12) United States Patent
Guduru et al.

(10) Patent No.: US 12,452,765 B2
(45) Date of Patent: Oct. 21, 2025

(54) SYSTEMS AND METHODS FOR PROVIDING OVER-THE-AIR USER EQUIPMENT ROUTE SELECTION POLICY CONFIGURATION UPDATES

(71) Applicant: Verizon Patent and Licensing Inc., Basking Ridge, NJ (US)

(72) Inventors: Vijayakrishna P. Guduru, Denville, NJ (US); Raquel Morera Sempere, Weehawken, NJ (US); Sudhakar Reddy Patil, Flower Mound, TX (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 18/319,900

(22) Filed: May 18, 2023

(65) Prior Publication Data
US 2024/0388995 A1    Nov. 21, 2024

(51) Int. Cl.
*H04W 40/24* (2009.01)
(52) U.S. Cl.
CPC .................. *H04W 40/24* (2013.01)
(58) Field of Classification Search
None
See application file for complete search history.

(56) References Cited

U.S. PATENT DOCUMENTS

| | | | | |
|---|---|---|---|---|
| 12,294,929 B2 * | 5/2025 | Schumacher | ......... | H04W 40/02 |
| 2022/0272031 A1 * | 8/2022 | Miklós | ................ | H04W 40/02 |
| 2023/0217513 A1 * | 7/2023 | Hashmi | ................ | H04W 8/183 |
| 2023/0422142 A1 * | 12/2023 | Vakeesar | ............... | H04W 40/20 |
| 2024/0388991 A1 * | 11/2024 | Wei | ...................... | H04W 40/12 |
| 2025/0168108 A1 * | 5/2025 | Karampatsis | ......... | H04L 45/306 |

OTHER PUBLICATIONS

ETSI TS 123 502 V16.7.0, "5G; Procedures for the 5G System (5GS) (3GPP TS 23.502 version 16.7.0 Release 16)," Jan. 2021, 607 Pages. (Year: 2021).*
ETSI TS 123 288 V16.4.0, "5G; Architecture enhancements for 5G System (5GS) to support network data analytics services (3GPP TS 23.288 version 16.4.0 Release 16)," Jul. 2020, 68 Pages. (Year: 2020).*
ETSI TS 133 501 V16.3.0, "5G; Security architecture and procedures for 5G System (3GPP TS 33.501 version 16.3.0 Release 16)," Aug. 2020, 251 Pages. (Year: 2020).*

(Continued)

*Primary Examiner* — Brian S Roberts

(57) ABSTRACT

A network device may determine a user equipment route selection policy (URSP) for a first network slice, and may provide the URSP to a user equipment (UE) via non-access stratum (NAS) signaling. The network device may determine an updated URSP for a second network slice that is different than the first network slice, and may determine that the NAS signaling is unavailable for the UE. The network device may provide, based on determining that the NAS signaling is unavailable, the updated URSP to a subscriber identity module (SIM) over-the-air (OTA) system to cause the SIM-OTA system to provide the updated URSP to the UE.

20 Claims, 6 Drawing Sheets

(56) References Cited

OTHER PUBLICATIONS

3GPP TS 23.501 V18.1.0, "3rd Generation Partnership Project; Technical Specification Group Services and System Aspects; System architecture for the 5G System (5GS); Stage 2 (Release 18)," Mar. 2023, 667 Pages.

3GPP TS 23.503 V18.1.0, "3rd Generation Partnership Project; Technical Specification Group Services and System Aspects; Policy and charging control framework for the 5G System (5GS); Stage 2 (Release 18)," Mar. 2023, 165 Pages.

3GPP TS 31.102 V18.0.0, "3rd Generation Partnership Project; Technical Specification Group Core Network and Terminals; Characteristics of the Universal Subscriber Identity Module (USIM) application (Release 18)," Mar. 2023, 373 Pages.

\* cited by examiner

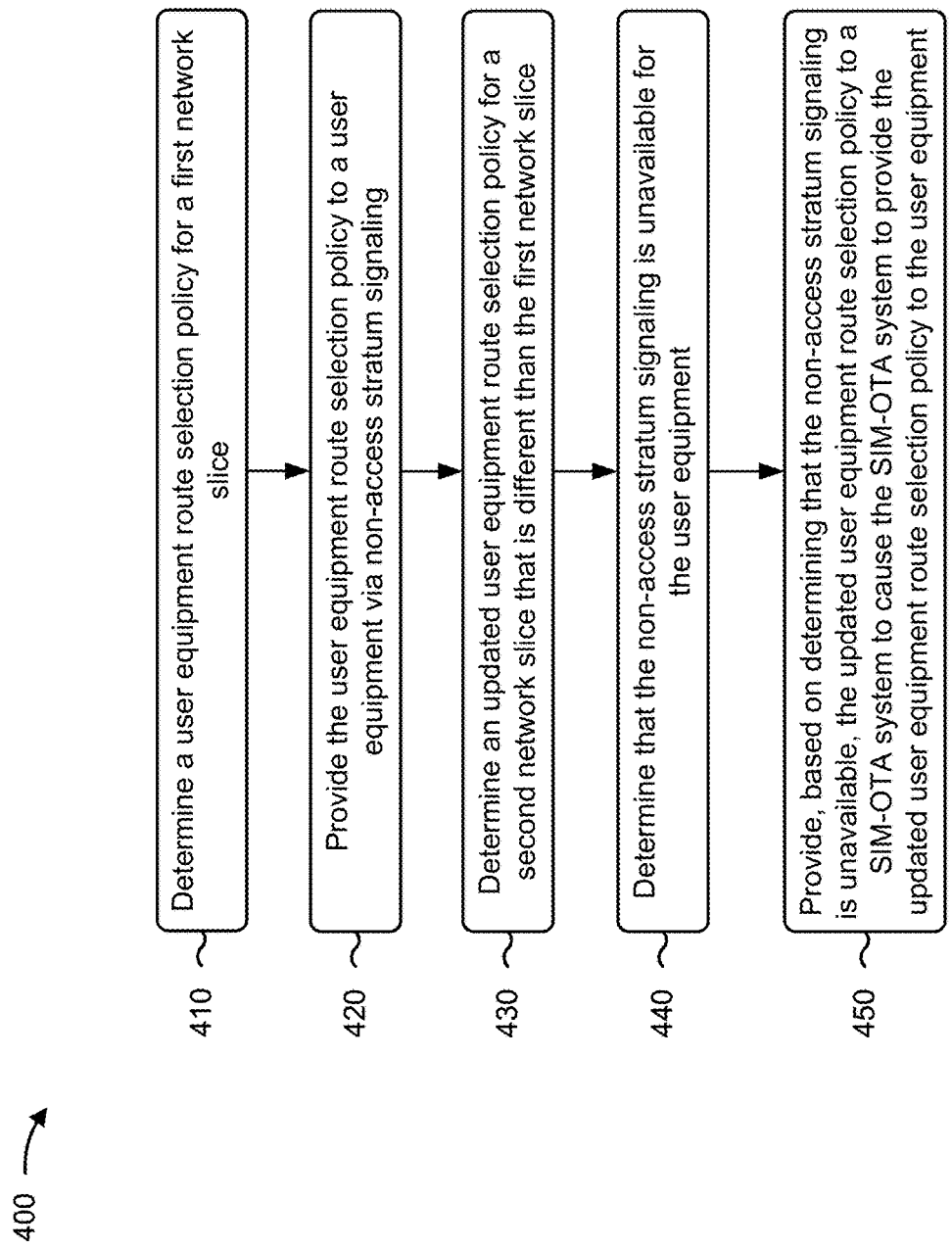

SYSTEMS AND METHODS FOR PROVIDING OVER-THE-AIR USER EQUIPMENT ROUTE SELECTION POLICY CONFIGURATION UPDATES

BACKGROUND

Network slicing is an end-to-end capability that provides different fifth generation (5G) core network services with different quality of service (QOS) to user equipments (UEs). A network slice is a logical network that provides specific network capabilities and characteristics to UEs.

BRIEF DESCRIPTION OF THE DRAWINGS

FIG. 4 is a flowchart of an example process for providing OTA URSP configuration updates.

DETAILED DESCRIPTION OF EXAMPLE EMBODIMENTS

Figure 1A:
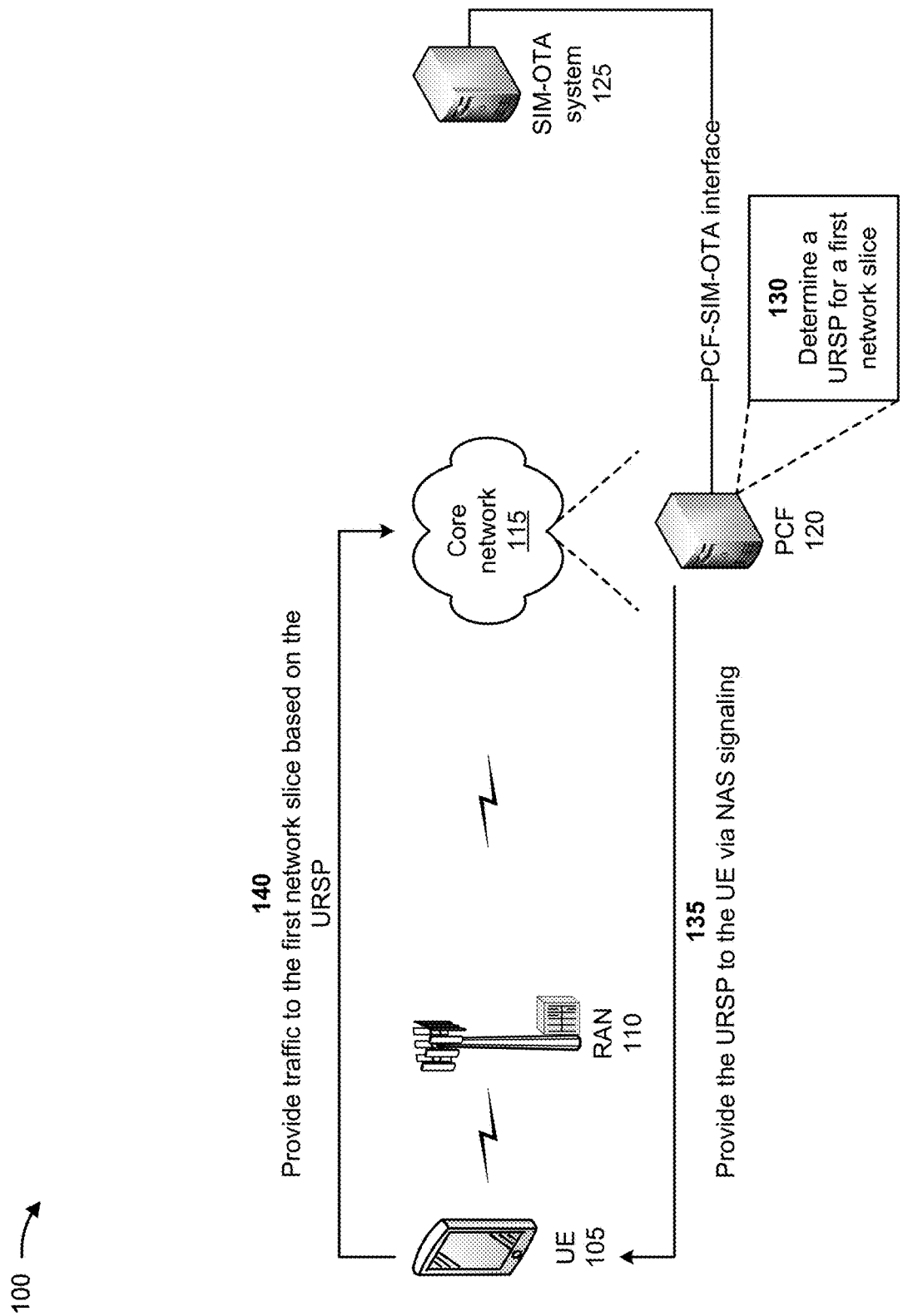
FIGS. 1A-1C are diagrams of an example associated with providing over-the-air (OTA) user equipment route selection policy (URSP) configuration updates.

The following detailed description of example implementations refers to the accompanying drawings. The same reference numbers in different drawings may identify the same or similar elements.

There is a high demand to differentiate service, connection, and mobility handling with network slices. The differentiation in service can be based on a QoS identifier, a packet error rate, latency, and/or the like. A particular network slice may be updated based on a UE route selection policy (URSP) utilized by a UE for the particular network slice. The UE may rely on the URSP to route traffic to the particular network slice. A URSP utilized by a UE may be updated via non-access stratum (NAS) signaling (e.g., when the UE is associated with a fifth generation (5G) standalone (SA) core network) provided by a policy control function (PCF) of a 5G core network. Alternatively, when the UE is not associated with 5G SA coverage (e.g., when the UE is in a fourth generation (4G) core network) or when the UE fails to receive a URSP update in 5G SA coverage, the URSP utilized by the UE may be updated via signaling provided by a subscriber identity module (SIM) over-the-air (OTA) system. Alternatively, the URSP utilized by the UE may be updated via preloading the updated URSP on the UE.

However, network operators may deploy multiple slices for public and private networks, and may wish to dynamically update URSPs on UEs regardless of a UE coverage scenario (e.g., 5G SA coverage or 4G coverage (e.g., 5G non-standalone (NSA) coverage)). This includes moving a UE to a different slice or instantiating a new slice through a URSP. Current standards fail to address providing a URSP update via the SIM-OTA system since there is no interface between the PCF and the SIM-OTA system. Thus, current mechanisms for providing updated URSPs to UEs consume computing resources (e.g., processing resources, memory resources, communication resources, and/or the like), networking resources, and/or other resources associated with failing to provide a service associated with an updated URSP to a UE, providing poor user experiences for UEs attempting to access the service associated with the updated URSP, handling lost traffic for UEs attempting to access the service associated with the updated URSP, attempting to recover the lost traffic, and/or the like.

Some implementations described herein provide a network device (e.g., a PCF) that provides OTA URSP configuration updates. For example, the network device may determine a URSP for a first network slice, and may provide the URSP to a UE via NAS signaling. The network device may determine an updated URSP for a second network slice that is different than the first network slice, and may determine that the NAS signaling is unavailable for the UE. The network device may provide, based on determining that the NAS signaling is unavailable, the updated URSP to a SIM-OTA system to cause the SIM-OTA system to provide the updated URSP to the UE.

In this way, the network device provides OTA URSP configuration updates. For example, the network device may update a URSP configuration of a UE via a SIM-OTA system. The network device may provide the updated URSP configuration to the SIM-OTA system, and the SIM-OTA system may provide the updated URSP configuration to UE. The UE may utilize the updated URSP configuration to access a new network slice. Thus, the network device may conserve computing resources, networking resources, and/or other resources that would otherwise have been consumed by failing to provide a service associated with an updated URSP to a UE, providing poor user experiences for UEs attempting to access the service associated with the updated URSP, handling lost traffic for UEs attempting to access the service associated with the updated URSP, attempting to recover the lost traffic, and/or the like.

Figure 1B:
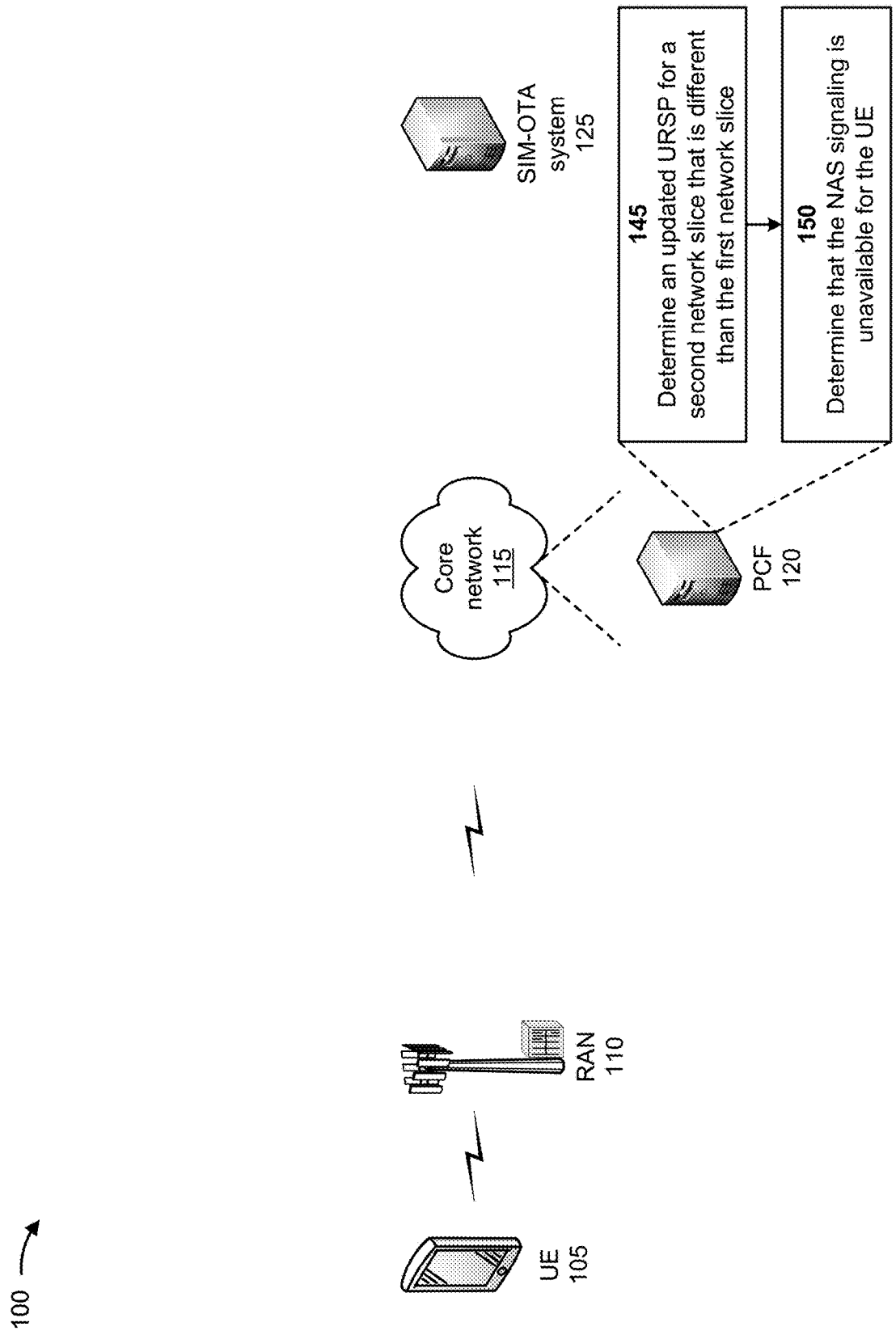
Figure 1C:
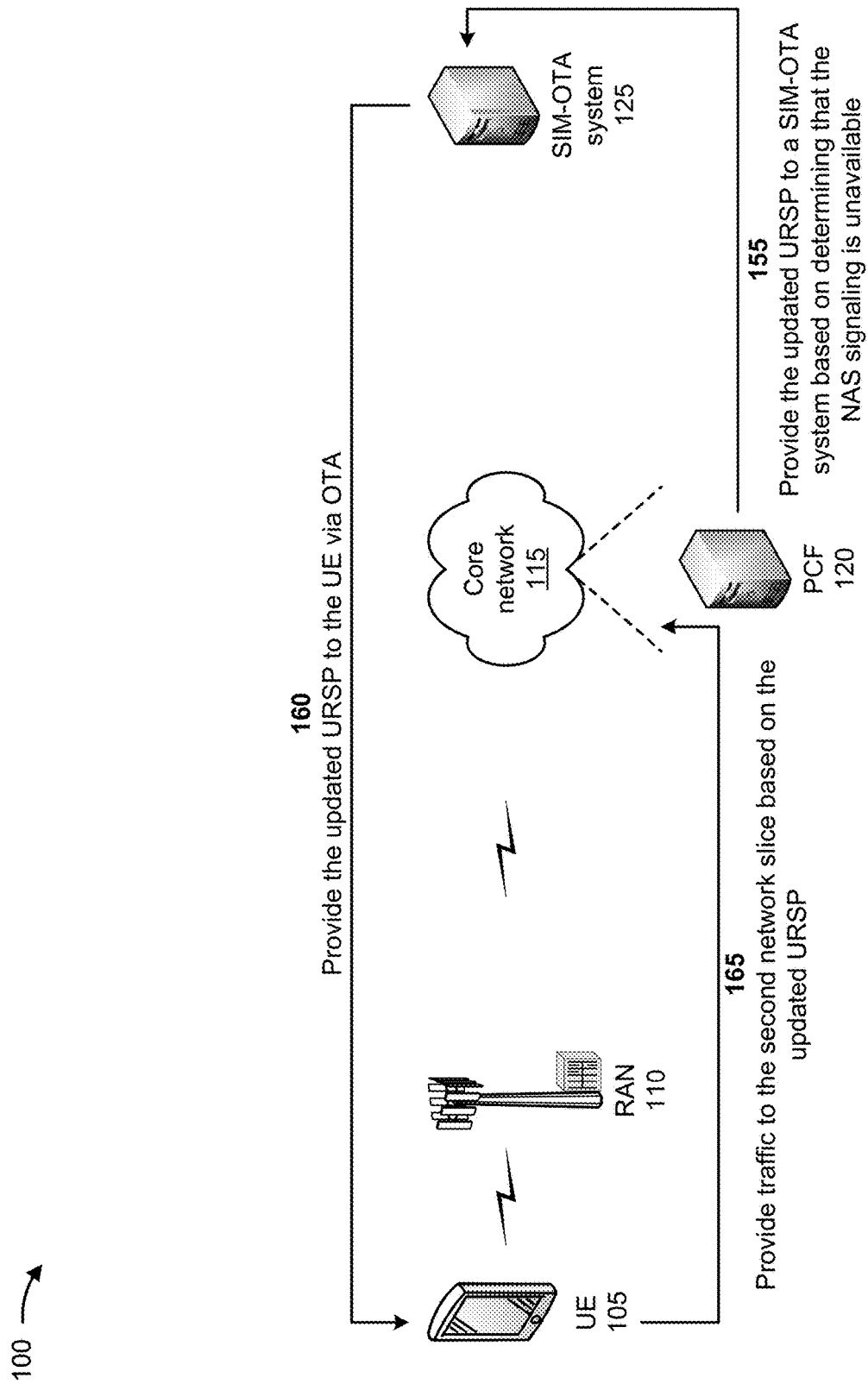

FIGS. 1A-1C are diagrams of an example 100 associated with providing OTA URSP configuration updates. As shown in FIGS. 1A-1C, example 100 includes a UE 105, a radio access network (RAN) 110, a core network 115 with a PCF 120, and a SIM-OTA system 125. Further details of the UE 105, the RAN 110, the core network 115, the PCF 120, and the SIM-OTA system 125 are provided elsewhere herein. Although only one UE 105 is depicted in FIG. 1A, in some implementations more than one UE 105 may be associated with the RAN 110, the core network 115, the PCF 120, and the SIM-OTA system 125.

As shown in FIG. 1A, an interface (e.g., a PCF-SIM-OTA interface) may be established between the PCF 120 and the SIM-OTA system 125 so that the PCF 120 and the SIM-OTA system 125 may communicate. As further shown in FIG. 1A, and by reference number 130, the PCF 120 may determine a URSP for a first network slice. For example, the PCF 120 may provide a first service via a first network slice of the core network 115. The first service may include an enhanced mobile broadband (eMBB) service, an ultra-reliable low latency communications (URLLC) service, a time sensitive networking (TSN) service, a massive Internet of Things (MIoT) service, a vehicle-to-vehicle (V2V) service, a vehicle-to-infrastructure (V2I) service, a vehicle-to-pedestrian (V2P) service, a high performance machine type communication (HMTC) service, or other customized traffic services. The first network slice may be utilized by the UE 105 based on a URSP associated with the first network slice. The UE 105 may rely on the URSP to route traffic to the first network slice. The PCF 120 may generate the URSP for the first network slice so that the UE 105 may receive the first service via the first network slice.

As further shown in FIG. 1A, and by reference number 135, the PCF 120 may provide the URSP to the UE 105 via NAS signaling. For example, when the UE 105 is associated with a 5G SA core network (e.g., the core network 115), a URSP utilized by the UE 105 may be updated via NAS signaling. In some implementations, the PCF 120 may determine whether the UE 105 is associated with a 5G SA core network. The PCF 120 may determine that NAS signaling is available for the UE 105 when the PCF 120 determines that the UE 105 is associated with the 5G SA core network. Alternatively, the PCF 120 may determine that NAS signaling is unavailable for the UE 105 when the PCF 120 determines that the UE 105 is not associated with the 5G SA core network (e.g., is associated with a 4G core network or a 5G NSA core network). When the PCF 120 determines that NAS signaling is available for the UE 105, the PCF 120 may provide the URSP to the UE 105 via NAS signaling.

As further shown in FIG. 1A, and by reference number 140, the UE 105 may provide traffic to the first network slice based on the URSP. For example, the UE 105 may receive the URSP from the PCF 120, via NAS signaling, and may execute the URSP. Execution of the URSP may cause the UE 105 to initiate a protocol data unit (PDU) establishment process that connects the UE 105 to the first network slice. The UE 105 may utilize the first service via the first network slice and may provide traffic, associated with the first service, to the first network slice.

As shown in FIG. 1B, and by reference number 145, the PCF 120 may determine an updated URSP for a second network slice that is different than the first network slice. For example, the PCF 120 may provide a second service via a second network slice of the core network 115. The second service may include an eMBB service, a URLLC service, a TSN service, an MIoT service, a V2V service, a V2I service, a V2P service, an HMTC service, or other customized traffic services. The second network slice may be utilized by the UE 105 based on an updated URSP associated with the second network slice. The UE 105 may rely on the updated URSP to route traffic to the second network slice. The PCF 120 may generate the updated URSP for the second network slice so that the UE 105 may receive the second service via the second network slice.

As further shown in FIG. 1B, and by reference number 150, the PCF 120 may determine that the NAS signaling is unavailable for the UE 105. For example, when the UE 105 is associated with a 5G SA core network (e.g., the core network 115), a URSP to be utilized by the UE 105 may be updated via NAS signaling. In some implementations, the PCF 120 may determine whether the UE 105 is associated with a 5G SA core network. The PCF 120 may determine that NAS signaling is available for the UE 105 when the PCF 120 determines that the UE 105 is associated with the 5G SA core network. Alternatively, the PCF 120 may determine that NAS signaling is unavailable for the UE 105 when the PCF 120 determines that the UE 105 is not associated with a 5G SA core network (e.g., is associated with a 4G core network or a 5G NSA core network).

As shown in FIG. 1C, and by reference number 155, the PCF 120 may provide the updated URSP to the SIM-OTA system 125 based on determining that the NAS signaling is unavailable. For example, when the PCF 120 determines that NAS signaling is unavailable for the UE 105, the PCF 120 may utilize the interface (e.g., the PCF-SIM-OTA interface), established between the PCF 120 and the SIM-OTA system 125, to provide the updated URSP to the SIM-OTA system 125. The SIM-OTA system 125 may receive the updated URSP from the PCF 120 via the interface.

As further shown in FIG. 1C, and by reference number 160, the SIM-OTA 125 may provide the updated URSP to the UE 105 via OTA signaling. For example, when the SIM-OTA system 125 receives the updated URSP from the PCF 120, the SIM-OTA system 125 may provide the updated URSP to the UE 105 via OTA signaling. In this way, the updated URSP may be provided to the UE 105, and via the SIM-OTA system 125, due to the interface provided between the PCF 120 and the SIM-OTA system 125.

As further shown in FIG. 1C, and by reference number 165, the UE 105 may provide traffic to the second network slice based on the updated URSP. For example, the UE 105 may receive the updated URSP from the SIM-OTA system 125, via OTA signaling, and may execute the updated URSP. Execution of the updated URSP may cause the UE 105 to initiate a PDU establishment process that connects the UE 105 to the second network slice. The UE 105 may utilize the second service via the second network slice and may provide traffic, associated with the second service, to the second network slice.

In this way, the PCF 120 provides OTA URSP configuration updates. For example, the PCF 120 may update a URSP configuration of the UE 105 via the SIM-OTA system 125. The PCF 120 may provide the updated URSP configuration to the SIM-OTA system 125, and the SIM-OTA system 125 may provide the updated URSP configuration to the UE 105 through SIM/eSIM. The UE 105 may utilize the updated URSP configuration to access a new network slice. Thus, the PCF 120 may conserve computing resources, networking resources, and/or other resources that would otherwise have been consumed by failing to provide a service associated with an updated URSP to the UE 105, providing poor user experiences for UEs 105 attempting to access the service associated with the updated URSP, handling lost traffic for UEs 105 attempting to access the service associated with the updated URSP, attempting to recover the lost traffic, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
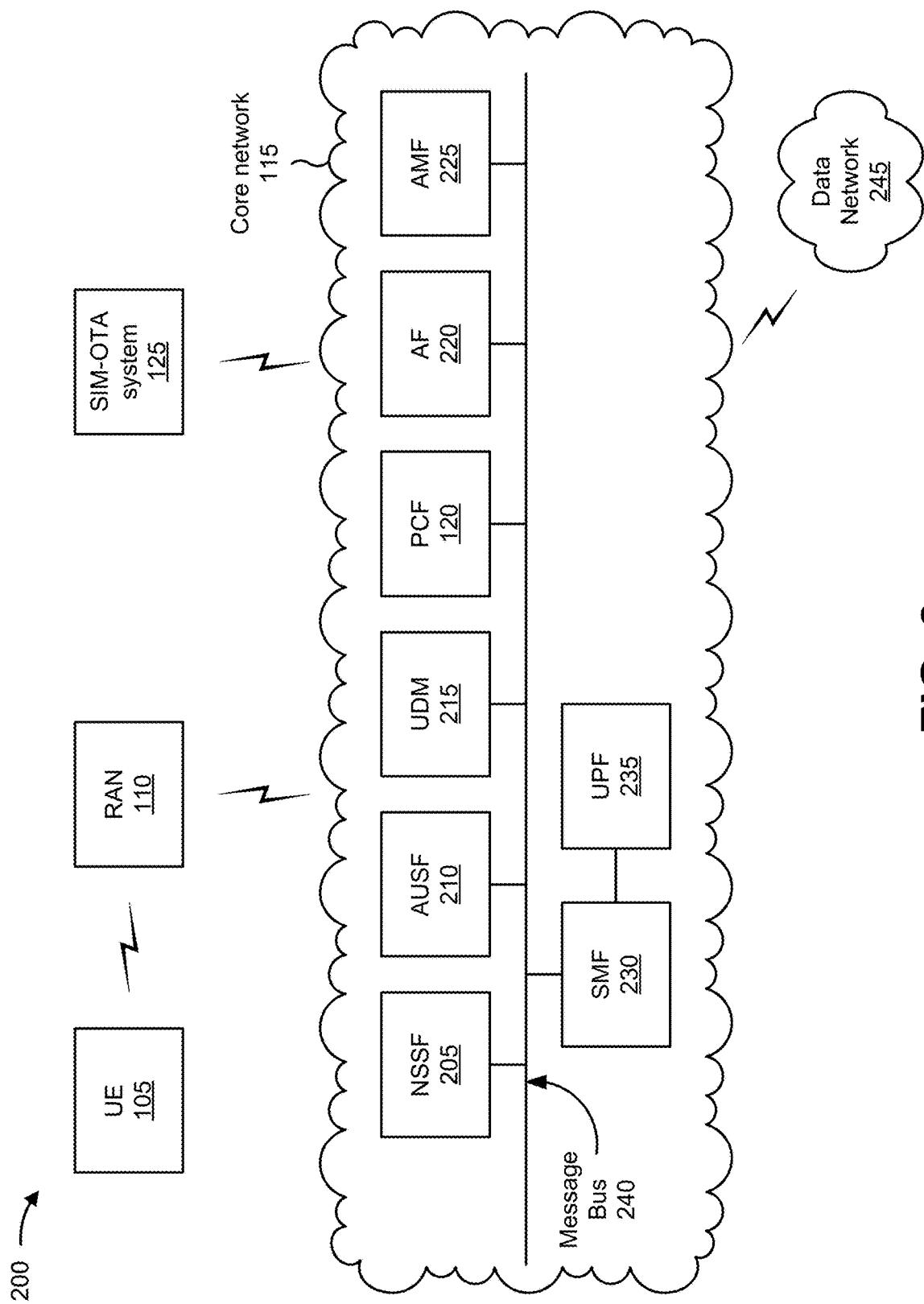
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, the PCF 120, the SIM-OTA system 125, and a data network 245. Devices and/or networks of the example environment 200 may interconnect via wired connections, wireless connections, or a combination of wired and wireless connections.

The UE 105 may include one or more devices capable of receiving, generating, storing, processing, and/or providing information, as described elsewhere herein. The UE 105 may include a communication device and/or a computing device. For example, the UE 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The SIM-OTA system 125 may include one or more devices capable of receiving, generating, storing, processing, providing, and/or routing information, as described elsewhere herein. The SIM-OTA system 125 may include a communication device and/or a computing device. For example, the SIM-OTA system 125 may include a server, such as an application server, a client server, a web server, a database server, a host server, a proxy server, a virtual server (e.g., executing on computing hardware), or a server in a cloud computing system. In some implementations, the SIM-OTA system 125 may include computing hardware used in a cloud computing environment.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, an authentication server function (AUSF) 210, a unified data management (UDM) component 215, the PCF 120, an application function (AF) 220, an access and mobility management function (AMF) 225, a session management function (SMF) 230, and/or a user plane function (UPF) 235. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the UE 105 in the wireless telecommunications system.

The UDM 215 includes one or more devices that store user data and profiles in the wireless telecommunications system. The UDM 215 may be used for fixed access and/or mobile access in the core network 115.

The PCF 120 includes one or more devices that provide a policy framework that incorporates network slicing, roaming, packet processing, and/or mobility management, among other examples.

The AF 220 includes one or more devices that support application influence on traffic routing, access to a network exposure function, and/or policy control, among other examples.

The AMF 225 includes one or more devices that act as a termination point for non-access stratum (NAS) signaling and/or mobility management, among other examples.

The SMF 230 includes one or more devices that support the establishment, modification, and release of communication sessions in the wireless telecommunications system. For example, the SMF 230 may configure traffic steering policies at the UPF 235 and/or may enforce user equipment Internet protocol (IP) address allocation and policies, among other examples.

The UPF 235 includes one or more devices that serve as an anchor point for intraRAT and/or interRAT mobility. The UPF 235 may apply rules to packets, such as rules pertaining to packet routing, traffic reporting, and/or handling user plane QoS, among other examples.

The message bus 240 represents a communication structure for communication among the functional elements. In other words, the message bus 240 may permit communication between two or more functional elements.

The data network 245 includes one or more wired and/or wireless data networks. For example, the data network 245 may include an Internet protocol multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
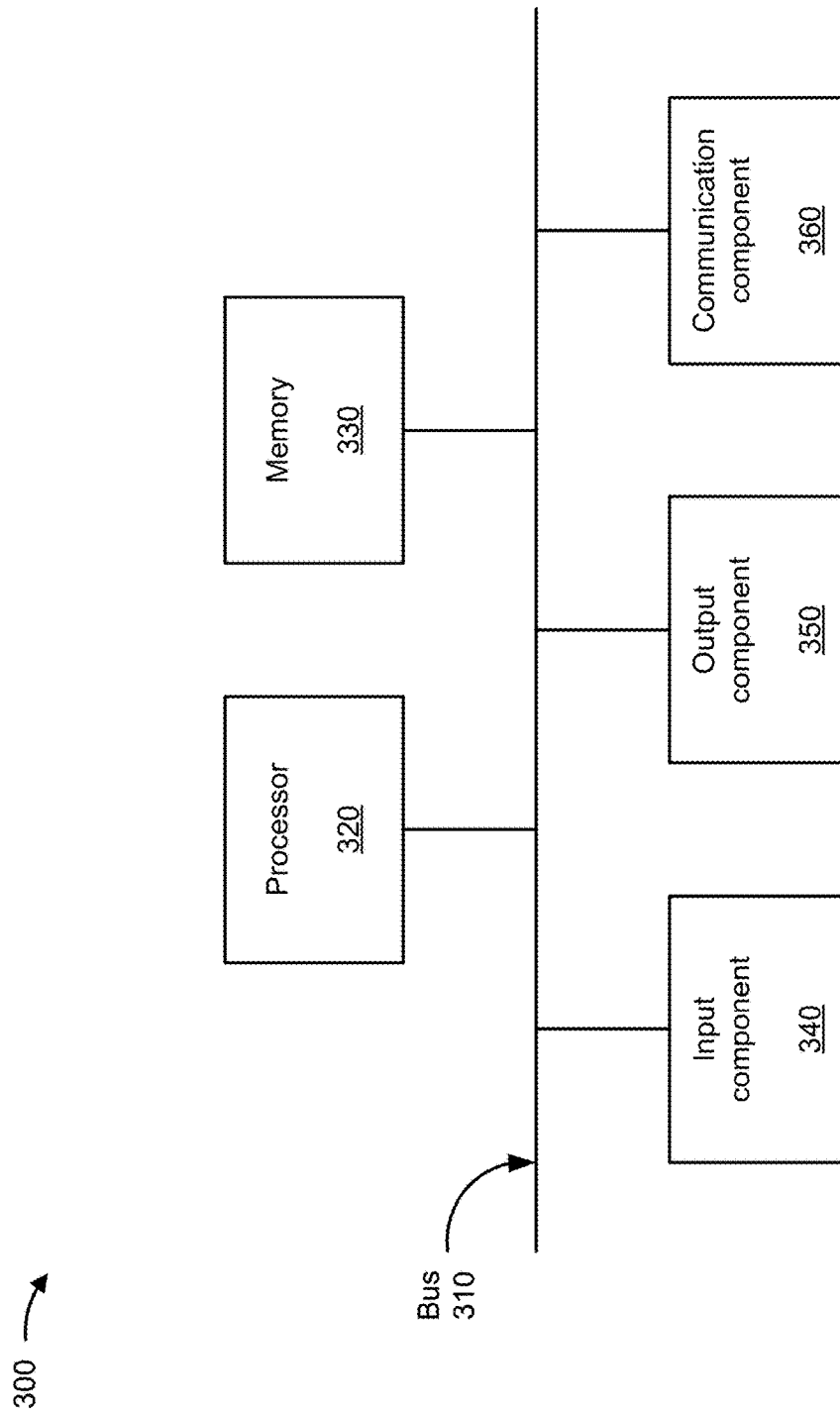
FIG. 3 is a diagram of example components of one or more devices of FIG. 2.

FIG. 3 is a diagram of example components of a device 300, which may correspond to the UE 105, the RAN 110, the PCF 120, the SIM-OTA system 125, the NSSF 205, the AUSF 210, the UDM 215, the AF 220, the AMF 225, the SMF 230, and/or the UPF 235. In some implementations, the UE 105, the RAN 110, the PCF 120, the SIM-OTA system 125, the NSSF 205, the AUSF 210, the UDM 215, the AF 220, the AMF 225, the SMF 230, and/or the UPF 235 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing OTA URSP configuration updates. In some implementations, one or more process blocks of FIG. 4 may be performed by a network device (e.g., the PCF 120). In some implementations, one or more process blocks of FIG. 4 may be performed by another device or a group of devices separate from or including the network device, such as a SIM-OTA system (e.g., the SIM-OTA system 125). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include determining a URSP for a first network slice (block 410). For example, the network device may determine a URSP for a first network slice, as described above. In some implementations, the network device is a PCF of a core network.

As further shown in FIG. 4, process 400 may include providing the URSP to a UE via NAS signaling (block 420). For example, the network device may provide the URSP to a UE via NAS signaling, as described above. In some implementations, the URSP is to configure the UE to provide traffic to the first network slice. In some implementations, the URSP is to configure the UE to establish a PDU session for the first network slice.

As further shown in FIG. 4, process 400 may include determining an updated URSP for a second network slice that is different than the first network slice (block 430). For example, the network device may determine an updated URSP for a second network slice that is different than the first network slice, as described above. In some implementations, the first network slice and the second network slice are provided by a core network that includes the network device.

As further shown in FIG. 4, process 400 may include determining that the NAS signaling is unavailable for the UE (block 440). For example, the network device may determine that the NAS signaling is unavailable for the UE, as described above. In some implementations, determining that the NAS signaling is unavailable for the UE includes determining that the UE fails to receive 5G SA coverage or is receiving 4G coverage, and determining that the NAS signaling is unavailable for the UE based on determining that the UE fails to receive the 5G SA coverage or is receiving the 4G coverage.

As further shown in FIG. 4, process 400 may include providing, based on determining that the NAS signaling is unavailable, the updated URSP to a SIM-OTA system to cause the SIM-OTA system to provide the updated URSP to the UE (block 450). For example, the network device may provide, based on determining that the NAS signaling is unavailable, the updated URSP to a SIM-OTA system to cause the SIM-OTA system to provide the updated URSP to the UE, as described above. In some implementations, the SIM-OTA system is configured to provide the updated URSP over-the-air to the UE. In some implementations, the updated URSP is to configure the UE to provide traffic to the second network slice.

In some implementations, providing the updated URSP to the SIM-OTA system includes providing the updated URSP to the SIM-OTA system via an interface provided between the network device and the SIM-OTA system. In some implementations, the updated URSP is to configure the UE to establish a PDU session for the second network slice. In some implementations, the SIM-OTA system is configured to write the updated URSP to a SIM of the UE.

In some implementations, process 400 includes determining that the NAS signaling is available for the UE prior to providing the URSP to the UE via the NAS signaling. In some implementations, process 400 includes establishing an interface between the network device and the SIM-OTA system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a network device, a user equipment route selection policy for a first network slice;
   providing, by the network device, the user equipment route selection policy to a user equipment via non-access stratum signaling;
   determining, by the network device, an updated user equipment route selection policy for a second network slice that is different than the first network slice;
   determining, by the network device, that the non-access stratum signaling is unavailable for the user equipment; and
   providing, by the network device and based on determining that the non-access stratum signaling is unavailable, the updated user equipment route selection policy to a subscriber identity module (SIM) over-the-air (OTA) system to cause the SIM-OTA system to provide the updated user equipment route selection policy to the user equipment.

2. The method of claim 1, wherein the user equipment route selection policy is to configure the user equipment to provide traffic to the first network slice.

3. The method of claim 1, wherein the SIM-OTA system is configured to provide the updated user equipment route selection policy over-the-air to the user equipment.

4. The method of claim 1, wherein the updated user equipment route selection policy is to configure the user equipment to provide traffic to the second network slice.

5. The method of claim 1, wherein providing the updated user equipment route selection policy to the SIM-OTA system comprises:
providing the updated user equipment route selection policy to the SIM-OTA system via an interface provided between the network device and the SIM-OTA system.

6. The method of claim 1, wherein the network device is a policy control function of a core network.

7. The method of claim 1, further comprising:
determining that the non-access stratum signaling is available for the user equipment prior to providing the user equipment route selection policy to the user equipment via the non-access stratum signaling.

8. A network device, comprising:
one or more processors configured to:
determine a user equipment route selection policy for a first network slice;
provide the user equipment route selection policy to a user equipment via non-access stratum signaling;
determine an updated user equipment route selection policy for a second network slice that is different than the first network slice;
determine that the non-access stratum signaling is unavailable for the user equipment; and
provide, based on determining that the non-access stratum signaling is unavailable, the updated user equipment route selection policy to a subscriber identity module (SIM) over-the-air (OTA) system to cause the SIM-OTA system to provide the updated user equipment route selection policy to the user equipment,
wherein the updated user equipment route selection policy is to configure the user equipment to provide traffic to the second network slice.

9. The network device of claim 8, wherein the one or more processors, to determine that the non-access stratum signaling is unavailable for the user equipment, are configured to:
determine that the user equipment fails to receive fifth generation (5G) standalone (SA) coverage or is receiving fourth generation (4G) coverage; and
determine that the non-access stratum signaling is unavailable for the user equipment based on determining that the user equipment fails to receive the 5G SA coverage or is receiving the 4G coverage.

10. The network device of claim 8, wherein the user equipment route selection policy is to configure the user equipment to establish a protocol data unit session for the first network slice.

11. The network device of claim 8, wherein the updated user equipment route selection policy is to configure the user equipment to establish a protocol data unit session for the second network slice.

12. The network device of claim 8, wherein the SIM-OTA system is configured to write the updated user equipment route selection policy to a SIM of the user equipment.

13. The network device of claim 8, wherein the first network slice and the second network slice are provided by a core network that includes the network device.

14. The network device of claim 8, wherein the one or more processors are further configured to:
establish an interface between the network device and the SIM-OTA system.

15. A non-transitory computer-readable medium storing a set of instructions, the set of instructions comprising:
one or more instructions that, when executed by one or more processors of a network device, cause the network device to:
establish an interface between the network device and a subscriber identity module (SIM) over-the-air (OTA) system;
determine a user equipment route selection policy for a first network slice;
provide the user equipment route selection policy to a user equipment via non-access stratum signaling;
determine an updated user equipment route selection policy for a second network slice that is different than the first network slice;
determine that the non-access stratum signaling is unavailable for the user equipment; and
provide, based on determining that the non-access stratum signaling is unavailable, the updated user equipment route selection policy to the SIM-OTA system to cause the SIM-OTA system to provide the updated user equipment route selection policy to the user equipment.

16. The non-transitory computer-readable medium of claim 15, wherein the one or more instructions, that cause the network device to provide the updated user equipment route selection policy to the SIM-OTA system, cause the network device to:
provide the updated user equipment route selection policy to the SIM-OTA system via the interface provided between the network device and the SIM-OTA system.

17. The non-transitory computer-readable medium of claim 15, wherein the network device is a policy control function of a core network.

18. The non-transitory computer-readable medium of claim 15, wherein the one or more instructions further cause the network device to:
determine that the non-access stratum signaling is available for the user equipment prior to providing the user equipment route selection policy to the user equipment via the non-access stratum signaling.

19. The non-transitory computer-readable medium of claim 15, wherein the one or more instructions, that cause the network device to determine that the non-access stratum signaling is unavailable for the user equipment, cause the network device to:
determine that the user equipment fails to receive fifth generation (5G) standalone (SA) coverage or is receiving fourth generation (4G) coverage; and
determine that the non-access stratum signaling is unavailable for the user equipment based on determining that the user equipment fails to receive the 5G SA coverage or is receiving the 4G coverage.

20. The non-transitory computer-readable medium of claim 15, wherein the SIM-OTA system is configured to write the updated user equipment route selection policy to a SIM of the user equipment.

* * * * *